United States Patent [19]

Sano et al.

[11] Patent Number: 4,769,305

[45] Date of Patent: Sep. 6, 1988

[54] PRESSURE-SENSITIVE RECORDING MATERIAL

[75] Inventors: Shojiro Sano; Keiso Saeki, both of Shizuoka, Japan

[73] Assignee: Fuji Photo Film Co., Ltd., Kanagawa, Japan

[21] Appl. No.: 4,786

[22] Filed: Jan. 8, 1987

Related U.S. Application Data

[63] Continuation of Ser. No. 672,319, Nov. 16, 1984.

[30] Foreign Application Priority Data

Nov. 16, 1983 [JP] Japan ............................... 58-215815

[51] Int. Cl.$^4$ .......................... B41M 5/18; C03C 1/72

[52] U.S. Cl. .................................... 430/138; 346/210; 346/211; 346/212; 346/216; 346/225

[58] Field of Search ............... 346/210, 211, 212, 216, 346/225; 430/138

[56] References Cited

U.S. PATENT DOCUMENTS

| | | | |
|---|---|---|---|
| 3,934,070 | 1/1976 | Kimura et al. | 346/212 |
| 3,983,292 | 9/1976 | Saito et al. | 346/212 |
| 4,226,962 | 10/1980 | Stolfo | 346/210 X |
| 4,262,936 | 4/1981 | Miyamoto | 346/210 X |
| 4,379,721 | 4/1983 | Qualitz et al. | 346/216 X |
| 4,461,495 | 7/1984 | Nakasato et al. | 346/216 X |
| 4,467,339 | 8/1984 | Asami et al. | 346/216 X |
| 4,507,671 | 3/1985 | Koike et al. | 346/225 X |

*Primary Examiner*—Mukund J. Shah

*Attorney, Agent, or Firm*—Sughrue, Mion, Zinn, Macpeak, and Seas

[57] ABSTRACT

A pressure-sensitive recording material is described, comprising an electron-donating color former and an electron-accepting color developer wherein said color developer comprises a mixture of (a) an aromatic carboxylic acid metal salt and (b) a hindered phenol as a combined electron-accepting color developer. The aromatic carboxylic acids should desirably have a hydroxyl group in the ortho or para position to the carboxyl group and preferably is a salicylic acid derivative. The hindered phenols preferably have an alkyl substituent in at least one of the 2 and 6 positions. This pressure-sensitive recording material can provide color images having an excellent fastness to light and solvents.

19 Claims, No Drawings

PRESSURE-SENSITIVE RECORDING MATERIAL

This is a continuation of application Ser. No. 672,319 filed Nov. 16, 1984.

FIELD OF THE INVENTION

This invention relates to a pressure-sensitive recording material. More particularly, it relates to a pressure-sensitive recording material comprising an electron-donating color former and an electron-accepting color developer wherein the color developer comprises a mixture of (a) an aromatic carboxylic acid metal salt and (b) a hindered phenol as a combined electron-accepting color developer (hereinafter, "color developer" for short).

BACKGROUND OF THE INVENTION

Pressure-sensitive recording materials, which utilize the color reaction between an electron-donating color former (hereinafter, "color former" for short) and a color developer, for example, clay such as acid clay, activated clay, attapulgite, zeolite, bentonite or kaolin, a metal salt of an aromatic carboxylic acid or a phenol-formaldehyde resin, are well known in the art and are described, for example, in U.S. Pat. Nos. 2,505,470, 2,505,489, 2,550,471, 2,548,366, 2,712,507, 2,730,456, 2,730,457 and 3,418,250 and Japanese Patent Publication (unexamined) Nos. 28411/1974 (corresponding to U.S. Pat. No. 3,896,255) and 44009/1975.

However, the pressure-sensitive recording materials in which the above color developers are used are not satisfactory in terms of fastness of the developed images to light and/or solvents and other disadvantages.

SUMMARY OF THE INVENTION

An object of the invention is to provide pressure-sensitive recording materials capable of developing color images having excellent fastness to light and solvents.

The above object of the present invention has been accomplished by pressure-sensitive recording material comprising a color former and a color developer wherein the color developer comprises a mixture of (a) a metal salt of an aromatic carboxylic acid and (b) a hindered phenol as the combined electron-accepting color developer.

DETAILED DESCRIPTION OF THE INVENTION

The aromatic carboxylic acid metal salts to be used in accordance with the present invention are described, for example, in U.S. Pat. Nos. 3,864,146 and 3,983,292 and Japanese Patent Application No. 25158/1978.

The aromatic carboxylic acids constituting the above aromatic carboxylic acid metal salts should desirably have a hydroxyl group in the ortho or para position to the carboxyl group and preferably are salicylic acid derivatives, in particular salicylic acid derivatives having at least one substituent, such as an alkyl, aryl or aralkyl group, in the ortho and/or para position to the hydroxyl group, with the sum of the carbon atoms in the substituent(s) being not less than 8.

The preferred examples of the aromatic carboxylic acid used in the present invention are represented by the following formula (I).

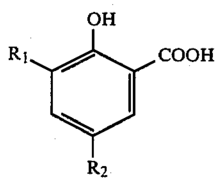

(I)

In the formula (I), $R_1$ and $R_2$, which may be the same or different, each represents an alkyl group having 3 to 10 carbon atoms, an aryl group having 6 to 12 carbon atoms or an aralkyl having 7 to 15 carbon atoms, preferably a t-butyl group, a t-amyl group, a t-hexyl, a α,α-dimethylbenzyl group or a α-methylbenzyl group.

Particularly preferred examples of the aromatic carboxylic acid are 3,5-di-tert-butylsalicylic acid, 3,5-di-tert amylsalicylic acid, 3,5-bis(α,α-dimethylbenzyl)salicylic acid, 3,5-bis(α-methylbenzyl)salicylic acid, 3-(α-methylbenzyl)-5-(α,α-dimethylbenzyl)salicylic acid, 3,5-di-tert-octylsalicylic acid and 3-cyclohexyl-5-(α,α-dimethylbenzyl)salicylic acid.

The metals constituting metal salts with the above aromatic carboxylic acids preferably include, among others, magnesium, aluminum, calcium, scandium, titanium, vanadium, chromium, manganese, iron, cobalt, nickel, copper, zinc, potassium, germanium, strontium, yttrium, zirconium, molybdenum, cadmium, indium, antimony, barium and tin. Among these metals, zinc, aluminum and calcium are more preferred and zinc is most preferred.

The hindered phenols to be used in accordance with the invention are preferably phenols having an alkyl substituent in at least one of the positions 2 and 6, and derivatives of such phenols. Examples of these preferred phenols are phenols having a tert-butyl group in at least one of the positions 2 and 6, and derivatives of such phenols. Those which have a plurality of phenolic hydroxyl groups within the molecule are preferred and those having 2 to 3 phenolic hydroxyl groups are particularly preferred.

The preferred examples of the hindered phenols used in the present invention are represented by the following formula (II) and (III).

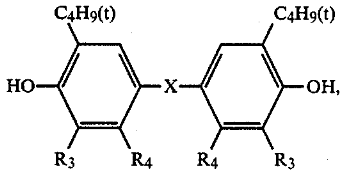

(II)

and

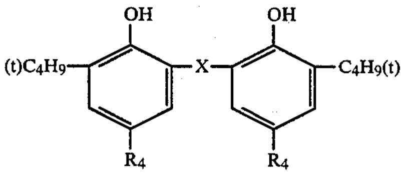

(III)

In the formulae (II) and (III), $R_3$ represents a t-butyl group, a methyl group, an ethyl group or a hydrogen atom, $R_4$ represents a hydrogen atom, a methyl group or an ethyl group, and X represents a sulfur atom or an alkylene group (preferably having 1 to 4 carbon atoms).

Typical examples of such phenolic compounds are:

4,4'-thiobis(3-methyl-6-tert-butylphenol),
4,4'-thiobis(2-methyl-6-tert-butylphenol),
2,2'-thiobis(4-methyl-6-tert-butylphenol),
2,2'-methylenebis(4-methyl-6-tert-butylphenol),
2,2'-methylenebis(4-ethyl-6-tert-butylphenol,
4,4'-butylidenebis(3-methyl-6-tert-butylphenol),
4,4'-methylenebis(2,6-di-tert-butylphenol),
1,1,3-tris(2-methyl-4-hydroxy-5-tert-butylphenol)butane,
n-octadecyl-3-(3',5'-di-tert-butyl-4'-hydroxyphenyl)-propionate, and
pentaerythritol tetrakis[3-(3,5-di-tert-butyl-4-hydroxyphenyl)propionate].

Among these particularly preferred are:
4,4'-thiobis(3-methyl-6-tert-butylphenol) and
2,2'-methylenebis(4-methyl-6-tert-butylphenol).

The proportion of the hindered phenol compound in the aromatic carboxylic acid metal salt-hindered phenol compound mixture which is to be used as the color developer in accordance with the invention is preferably in the range of 5 to 60% (% by weight) and more preferably in the range of 10 to 40%.

In the recording materials according to the invention, the color developer sheet can be produced by applying a dispersion or emulsion of the above-mentioned mixed color developer to the surface of a base support.

The color developer dispersion can be prepared by dispersing the mixed developer in an aqueous system mechanically in a ball mill, attritor, sand mill or the like.

The color developer emulsion can be prepared by dissolving the mixed color developer in an organic solvent followed by emulsification in water. The organic solvent to be used should be a solvent capable of dissolving the color developer in a concentration of not less than 10% by weight at 25° C. and thus includes, amont others aliphatic esters, aromatic esters, biphenyl derivatives, naphthalene derivatives and diphenylalkanes The color developer dispersion and emulsion may be used combinedly in an optional ratio therebetween.

In preparing the coating compositions, inorganic pigments, such as titanium oxide, zinc oxide, silicon oxide, calcium oxide, calcium carbonate, aluminum hydroxide, kaolin, active clay, talc and barium sulfate may be added for improving the applicability, hiding power and color developing ability and for producing other desirable effects. Dispersion of these inorganic pigments in a media dispersion mill such as a sand mill, ball mill or attritor can further produce desirable effects such as further improvement in color developing ability and improvement in the quality of the coated surfaces. A desirable amount of such inorganic pigment to be simultaneously used is 1 to 100 parts by weight, more desirably 2 to 50 parts by weight, per one part by weight of said color developer.

The thus-prepared coating composition is applied, following addition of a binder thereto, to a base support. The binder is preferably used in an amount of about 0.5 to 2 $g/m^2$.

As the binder, there may be used synthetic or natural polymeric materials generally known in the art, such as latices (e.g. styrene-butadiene copolymer latex), polyvinyl alcohol, maleic anhydride-styrene copolymer, starch, casein, gum arabic, gelatin, carboxymethylcellulose and methylcellulose.

The final amount of the color developer applied to the base support is suitably 0.1 $g/m^2$ to 3.0 $g/m^2$, preferably 0.2 $g/m^2$ to 1.0 $g/m^2$.

The selection of the color former to react with the color developer used in the recording material in accordance with the invention is not critical. Typical examples of the color former include triarylmethane type compounds, diphenylmethane type compounds, xanthene type compounds, thiazine type compounds, spiro type compounds, and mixtures of these.

Specific examples of triarylmethane compounds include 3,3-bis-(p-dimethylaminophenyl)-6-dimethylaminophthalide (namely, Crystal Violet lactone), 3,3-bis-(p-dimethylaminophenyl)phthalide, 3-(p-dimethylaminophenyl)-3-(1,2-dimethylindol-3-yl)phthalide, 3-(p-dimethylaminophenyl)-3-(2-methylindol-3-yl)phthalide, 3-(p-dimethylaminophenyl)-3-(2-phenylindol-3-yl)phthalide, 3,3-bis-(1,2-dimethylindol-3-yl)-5-dimethylaminophthalide, 3,3-bis-(1,2-dimethylindol-3-yl)-6-dimethylaminophthalide, 3,3-bis-(9-ethylcarbazol-3-yl)-5-dimethylaminophthalide, 3,3-bis-(2-phenylindol-3-yl)-5-dimethylaminophthalide and 3-p-dimethylaminophenyl-3-(1-methylpyrrol-2-yl)-6-dimethylaminophthalide. Specific example of dimethylmethane compounds include 4,4'-bis-dimethylaminobenzhydrin benzyl ether, N-halophenyl leuco Auramine and N-2,4,5-trichlorophenyl leuco Auramine. Specific examples of xanthene compounds include Rhodamine B anilino lactam, Rhodamine(p-nitroanilino)lactam, Rhodamine B(p-chloroanilino)lactam, 7-dimethylamino-2-methoxyfluoran, 7-diethylamino-2-methoxyfluoran, 7-diethylamino-3-methoxyfluoran, 7-diethylamino-3-chlorofluoran, 7-diethylamino-3-chloro-2-methylfluoran, 7-diethylamino-2,3-dimethylfluoran, 7-diethylamino-(3-acetylmethylamino)fluoran, 7-diethylamino-(3-methylamino)-fluoran, 3,7-diethylaminofluoran, 7-diethylamino-3-(dibenzylamino)fluoran, 7-diethylamino-3-(methylbenzylamino)fluoran, 7-diethylamino-3-(chloroethylmethylamino)fluoran and 7-diethylamino-3-(diethylamino)fluoran. Specific examples of thiazine compounds include benzoyl leuco Methylene Blue and p-nitrobenzyl leuco Methylene Blue. Specific examples of spiro compounds include 3-methylspiro-dinaphthoypran, 3-ethyl-spiro-dinaphthopyran, 3,3'-dichloro-spiro-dinaphthopyran, 3-benzyl spiro-dinaphthopyran, 3-methyl-naphtho-(3-methoxybenzo)spiropyran and 3-propylspiro-dibenzopyran. These compounds may be used alone or as a mixture.

In the practice of the invention, the color former is either dissolved in a solvent and encapsulated or dispersed in a binder solution, followed by application to a base support.

The preferred amount of the color former coated is about 0.01 to 0.2 $g/m^2$, more preferably 0.03 to 0.1 $g/m^2$.

As the solvent, natural and synthetic oils can be used either alone or in combination. Examples of the solvent are cottonseed oil, kerosene, paraffin, naphthenic oil, alkylated biphenyl, alkylated terphenyl, chlorinated paraffin, alkylated naphthalene and diphenylalkane, among others.

Color former-containing microcapsules are produced by the interfacial polymerization (as described in British Pat. Nos. 867,797, 950,443, 989,264, 1,091,076 and 1,046,409, and U.S. Pat. No. 4,409,156), in situ polymerization, phase separation (as described in U.S. Pat. Nos. 2,800,457 and 2,800,458), external polymerization (as described in Japanese Patent Publication (examined) No. 12518/63, and Japanese Patent Publication (unexamined) Nos. 42380/72, 8780/75, 9079/76, 66878/77, 84881/78, 84882/78 and 84883/78) or coacervation method (as described in U.S. Pat. Nos. 2,800,457 and 2,800,458), for instance.

In preparing a coating mixture containing the color former containing microcapsules, there is generally used a water-soluble binder or a latex type binder. Furthermore, a capsule-protecting agent, such as cellulose powder, granular starch or talc, is added to give a microencapsulated color former containing coating mixture.

The preferred examples of the base support used in the present invention include a paper, a synthetic paper, a polyethylene terephthalate and the like. However, it is not limited to these materials.

The color developer sheets for use in the pressure-sensitive recording materials in accordance with the invention, as prepared in the examples to be described later, were tested for their performance characteristics using the color former containing microcapsule sheet described below. Unless otherwise indicated herein, all parts, percents, ratios and the like are by weight.

PREPARATION OF COLOR FORMER-CONTAINING MICROCAPSULE SHEET

Five parts of partial sodium salt of polyvinylbenzenesulfonic acid (National Startch's VERSA TL 500; average molecular weight 500,000) was added to 95 parts of hot water at about 80° C. with stirring. After dissolution which required about 30 minutes, the solution was cooled. To the aqueous solution, which had a pH of 2 to 3, there was added 20 weight percent aqueous sodium hydroxide to make the pH 4.0. A diisopropylnaphthalene solution (100 parts) containing 2.5% crystal violet lactone and 1.0% benzoyl leuco methylene blue was dispersed in 100 parts of the above 5% aqueous solution of partial sodium salt of polyvinylbenzenesulfonic acid to give an emulsion having an average grain size of 4.5 microns. Separately, 6 parts of melamine, 11 parts of 37 weight percent aqueous formaldehyde solution and 30 parts of water was heated at 60° C. with stirring for 30 minutes to give a transparent aqueous solution of melamine, formaldehyde and an early stage melamine-formaldehyde condensate. This mixed aqueous solution had a pH of 6 to 8. This mixed aqueous solution of melamine, formaldehyde and early stage melamine-formaldehyde condensate is referred to as "early stage condensate solution". The early stage condensate solution obtained in the above manner was added to the above-mentioned emulsion and the pH of the resulting mixture was adjusted to 6.0 by adding 3.6 weight percent hydrochloric acid with stirring. The mixture was heated to 65° C. and stirring was continued at that temperature for 360 minutes. The resulting microcapsule dispersion was cooled to room temperature and adjusting to pH 9.0 with 20 weight percent sodium hydroxide.

A color former-containing microcapsule coating composition was prepared by adding, to the above capsule dispersion, 200 parts of 10 weight percent aqueous polyvinyl alcohol solution and 50 parts of granular starch, and further adding water to thereby adjust the solid content to 20%.

This coating mixture was applied to a base paper having a basis weight of 50 $g/m^2$ using an air knife coater in an amount such that the solid content was 5 $g/m^2$, followed by drying. Thus was obtained a color former containing microcapsule sheet.

The following examples illustrate the color developer material for pressure-sensitive recording in accordance with the invention in more detail. However, the examples are by no means limitative of the invention. Unless otherwise indicated herein, all parts, percents, ratios and the like are by weight.

EXAMPLE 1

Preparation of Emulsion

Ten parts of zinc 3,5-bis(α-methylbenzyl)-salicylate was dissolved in 20 parts of 1-isopropylphenyl-2-phenylethane by heating the mixture at 90° C. The solution was added to 50 parts of a 2% aqueous solution of polyvinyl alcohol (Kuraray's PVA-205), followed by addition of 0.1 part of a 10% aqueous solution of sodium sulfosuccinate as a surface active agent. The mixture was homogenized in a homogenizer to an average grain size of 3 microns. Thus was prepared emulsion (A).

Preparation of Dispersion

Dispersion (A) with an average grain size of 3 microns was prepared by uniformly dispersing 5 parts of zinc 3,5-bis(α-methylbenzyl)salicylate, 5 parts of 4,4'-thiobis(3-methyl-6-tert-butylphenol), 170 parts of calcium carbonate, 20 parts of zinc oxide and 1 part of sodium hexametaphosphate in 200 parts of water in a sand grinder.

Preparation of Coating Mixture

Forty parts of emulsion (A) (containing 5 parts of color developer) and 200 parts of dispersion (A) (containing a 5 parts of color developer) were blended, 100 parts of a 10% aqueous solution of PVA-110 (Kuraray) and 10 parts (as solids) of carboxy-modified SBR latex (Sumitomo Naugatuck's SN-304) were added to the resulting mixture, and water was added to adjust the solid content to 20%, whereby a coating solution was obtained.

Preparation of Color Developer Sheet

A sheet of base paper having a basis weight of 50 $g/m^2$ was coated with the above coating mixture to a solid amount of 5.0 $g/m^2$ using an air knife coater and then dried to give a color developer sheet.

EXAMPLES 2 TO 8

A color developer sheets were prepared in the same manner as Example 1 except that the aromatic carboxylic acid metal salt and/or the hindered phenol compound was changed to those shown in Table 1 below.

COMPARATIVE EXAMPLE 1

A color developer sheet was prepared in the same manner as Example 1 except that 10 parts of zinc 3,5-bis(α-methylbenzyl)salicylate was used in place of 5 parts of zinc 3,5-bis(α-methylbenzyl)salicylate and 5 parts of 4,4'-thiobis(3-methyl-6-tert-butylphenol) in the preparation of the dispersion in Example 1.

COMPARATIVE EXAMPLE 2

A color developer sheet was prepared in the same manner as comparative Example 1 except that the zinc 3,5-di-tert-butylsalicylate was used in place of the zinc 3,5-bis(α-methylbenzyl)salicylate.

COMPARATIVE EXAMPLE 3

A color developer sheet was prepared in the same manner as Comparative Example 1 except that the zinc 3,5-di-tert-hexylsalicylate was used in place of the zinc 3,5-bis(α-methylbenzyl)salicylate.

COMPARISON PERFORMANCE CHARACTERISTICS (1) Developing Ability:

The color former-containing microcapsule sheet was placed on the color developer sheet obtained in each of the examples and comparative example so that the microcapsule-carrying face came into contact with the color developer-carrying face. Color development was effected by applying a load of 600 kg/cm$^2$ and, 10 minutes after color development, the density of the developed image was measured at 610 nm using a Hitachi Color Analyzer Model 307 and recorded as the developing ability.

(2) Light Fastness:

For each of the color developer sheets obtained in the examples and comparative example, the developed image 10 minutes after development as obtained in the above test (1) was irradiated in a xenon fade meter (Suga Testing Machine's Model FAL-25AX-HC) for 4 hours and thereafter measured for the density at 610 nm. The light fastness was expressed in terms of the ratio of the density after irradiation to the density before irradiation.

(3) Solvent Fastness:

For each of the color developer sheets obtained in the examples and comparative example, the developed image 10 minutes after color development as obtained in test (1) was coated with castor oil to a thickness of about 0.5 micrometer and allowed to stand in an atmosphere of 25° C. and RH 65% for 24 hours. Thereafter, the density at 610 nm was measured and the solvent fastness was expressed in terms of the ratio of the density after castor oil treatment to the density before application of castor oil.

The results are shown in Table 1 below.

TABLE 1

| | Color Developer; 10 parts consisting of | | | | Performance Characteristics | | |
|---|---|---|---|---|---|---|---|
| | Aromatic Carboxylic Acid Metal Salt | | Hindered Phenol | | Developing Ability | Light Fastness | Solvent Fastness |
| Example 1 | Zinc 3,5-bis (α-methyl benzyl)salicylate | 7.5 parts | 4,4'-Thiobis (3-methyl-6-tert-butylphenol) | 2.5 parts | 1.04 | 0.76 | 0.55 |
| Example 2 | Zinc 3,5-bis (α-methyl benzyl)salicylate | 7.5 parts | 2,2'-Methylenebis (4-methyl-6-tert-butylphenol) | 2.5 parts | 1.03 | 0.73 | 0.53 |
| Example 3 | Zinc 3,5-bis (α-methyl benzyl)salicylate | 7.5 parts | 2,2'-Thiobis (4-methyl-6-tert-butylphenol) | 2.5 parts | 1.03 | 0.73 | 0.52 |
| Example 4 | Zinc 3,5-bis (α-methyl benzyl)salicylate | 7.5 parts | 4,4'-Butylidenebis (3-methyl-6-tert-butylphenol) | 2.5 parts | 1.03 | 0.70 | 0.48 |
| Example 5 | Zinc 3,5-di-tert-butylsalicylate | 7.5 parts | 4,4'-Thiobis (3-methyl-6-tert-butylphenol) | 2.5 parts | 1.00 | 0.58 | 0.40 |
| Example 6 | Zinc 3,5-di-tert-butylsalicylate | 7.5 parts | 2,2'-Methylenebis (4-methyl-6-tert-butylphenol) | 2.5 parts | 0.98 | 0.53 | 0.35 |
| Example 7 | Zinc 3,5-di-tert-hexylsalicylate | 7.5 parts | 4,4'-Thiobis (3-methyl-6-tert-butylphenol) | 2.5 parts | 1.01 | 0.61 | 0.44 |
| Example 8 | Zinc 3,5-di-tert-hexylsalicylate | 7.5 parts | 4,4'-Thiobis (3-methyl-6-tert-butylphenol) | 2.5 parts | 1.01 | 0.59 | 0.37 |
| Comparative Example 1 | Zinc 3,5-bis(α-methyl-benzyl)salicylate | 10 parts | — | | 1.01 | 0.38 | 0.30 |
| Comparative Example 2 | Zinc 3,5-di-tert-butylsalicylate | 10 parts | — | | 0.98 | 0.26 | 0.25 |
| Comparative Example 3 | Zinc 3,5-di-tert-hexylsalicylate | 10 parts | — | | 1.00 | 0.30 | 0.28 |

The data in Table 1 indicate that the color developer sheets according to the invention are superior in fastness of the developed image to light and solvents as compared with the color developer sheet used for comparison.

While the invention has been described in detail and with reference to specific embodiments thereof, it will be apparent to one skilled in the art that various changes and modifications can be made therein without departing from the spirit and scope thereof.

What is claimed is:

1. A pressure-sensitive recording material capable of forming an image upon color development due to the reaction of an electron-donating color former and an electron-accepting color developer, wherein the color developer comprises a mixture of (a) a metal salt of an aromatic carboxylic acid and (b) a hindered phenol which is a phenol having an alkyl substituent in at least one of the positions 2 and 6 or is a derivative thereof and which contains a plurality of phenolic hydroxyl groups wherein the proportion of the hindered phenol compound in the color developer comprising a mixture of the aromatic carboxylic acid metal salt and the hindered phenol compound is in the range of 5 to 60% by weight, wherein the aromatic carboxylic acid used is represented by the following formula (I):

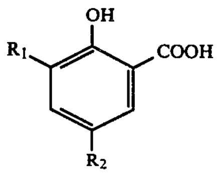

(I)

wherein $R_1$ and $R_2$, which may be the same or different, each represents an alkyl group having 3 to 10 carbon atoms, an aryl group having 6 to 12 carbon atoms or an aralkyl group having 7 to 15 carbon atoms.

2. The pressure-sensitive recording material as claimed in claim 1, wherein said aromatic carboxylic acid has a hydroxyl group in the ortho or para position to the carboxyl group.

3. The pressure-sensitive recording material as claimed in claim 2, wherein said aromatic carboxylic acid is a salicylic acid derivative having at least one substituent selected from the group consisting of an alkyl group, an aryl group or an aralkyl group, in the ortho and/or para position to the hydroxyl group, with the sum of the carbon atoms in the substituents being not less than 8.

4. The pressure-sensitive recording material as claimed in claim 1, wherein the metal constituting said metal salt is selected from the group consisting of magnesium, aluminum, calcium, scandium, titanium, vanadium, chromium, maganese, iron, cobalt, nickel, copper, zinc, potassium, germanium, strontium, yttrium, zirconium, molybdenum, cadmium, indium, antimony, barium and tin.

5. The pressure-sensitive recording material as claimed in claim 1, wherein said hindered phenol has a tert-butyl group in at least one of the positions 2 and 6 or is a derivative thereof.

6. The pressure-sensitive recording material as claimed in claim 1, wherein the proportion of the hindered phenol in the aromatic carboxylic metal acid salt-hindered phenol mixture is in the range of from 10 to 40% by weight.

7. The pressure-sensitive recording material claimed in claim 1, wherein the carboxylic acid used is represented by the formula (I) and wherein $R_1$ and $R_2$, which may be the same or different, each represents a t-butyl group, a t-amyl group, a t-hexyl group, a α,α-dimethylbenzyl group or a α-methylbenzyl group.

8. The pressure-sensitive recording materials claimed in claim 4, wherein the metal constituting said metal salt is selected form the group consisting of zinc, aluminum and calcium.

9. The pressure-sensitive recording material claimed in claim 8, wherein the metal constituting said metal salt is zinc.

10. The pressure-sensitive recording material claimed in claim 1, wherein the hindered phenol is represented by the formulae (II) or (III):

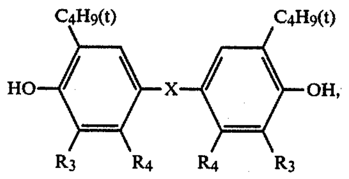

(II)

and

-continued

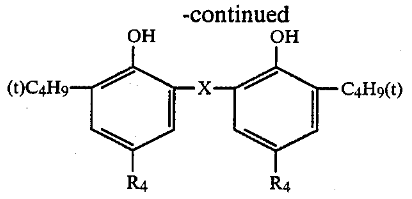

(III)

wherein $R_3$ represents a t-butyl group, a methyl group, an ethyl group or a hydrogen atom; $R_4$ represents a hydrogen atom, a methyl group or an ethyl group, and X represents a sulfur atom or a alkylene group.

11. The pressure-sensitive recording material claimed in claim 1, wherein the color former is selected from the group consisting essentially of triarylmethane type compounds, diphenylmethane type compounds, xanthene type compounds, thiazine type compounds, spiro type compounds, and mixtures thereof.

12. The pressure-sensitive recording material claimed in claim 1, wherein the color former is coated in an amount of about 0.01 to 0.2 $g/m^2$.

13. The pressure-sensitive recording material claimed in claim 12, wherein the color former is coated in an amount of 0.03 to 0.1 $g/m^2$.

14. The pressure-sensitive recording material claimed in claim 10, wherein the metal constituting said metal salt is selected from the group consisting of magnesium, aluminum, calcium, scandium, titanium, vanadium, chromium, maganese, iron, cobalt, nickel, copper, zinc, potassium, germanium, strontium, yttrium, zirconium, molybdemum, cadmium, indium, tin, antimony, and barium.

15. The pressure-sensitive recording material claimed in claim 14, wherein the color former is coated in an amount of about 0.01 to 0.2 $g/m^2$.

16. The pressure-sensitive recording material claimed in claim 15, wherein the carboxylic acid used is represented by the formula (I) and wherein $R_1$ and $R_2$, which may be the same or different, each represents a t-butyl group, a t-amyl group, a t-hexyl group, an α-dimethylbenzyl group or an α-methyl benzyl group.

17. The pressure-sensitive recording material claimed in claim 15, wherein the aromatic carboxylic acid of the metal salt of an aromatic carboxylic acid is selected from the group consisting of 3,5-di-tert-butylsalicylic acid, 3,5-di-tert amylsalicylic acid, 3,5-bis(α,α-dimethylbenzyl)salicylic acid, 3,5-bis(α-methylbenzyl)salicylic acid, 3-(α-methylbenzyl)-5-(α,α-dimethylbenzyl)-salicylic acid, 3,5-di-tert-octylsalicylic acid and 3-cyclohexyl-5-(α,α-dimethylbenzyl)salicylic acid.

18. The pressure-sensitive recording material claimed in claim 17, wherein the hindered phenol has two or three phenolic hydroxyl groups.

19. The pressure-sensitive recording material claimed in claim 18, wherein said hindered phenol has a tert-butyl group in at least one of the two or six positions.

* * * * *